United States Patent [19]

Rak et al.

[11] 4,299,698

[45] Nov. 10, 1981

[54] CIRCUIT AND APPARATUS FOR CONTROLLING A WATER SOFTENER

[75] Inventors: Stanley F. Rak, Mundelein; Donald P. DeVale, Sycamore; Roger Rehfeldt, Vernon Hills, all of Ill.

[73] Assignee: Culligan International Company, Northbrook, Ill.

[21] Appl. No.: 199,308

[22] Filed: Oct. 21, 1980

[51] Int. Cl.$^3$ ............................................. B01J 49/00
[52] U.S. Cl. ...................................... 210/96.1; 210/140
[58] Field of Search ....................... 210/96.1, 140, 143, 210/190, 191, 277–279, 662, 670, 687; 307/130, 131, 141, 141.4, 154; 324/65 R; 340/309.1, 870.42, 870.43, 870.38, 870.39

[56] References Cited

U.S. PATENT DOCUMENTS

| | | | |
|---|---|---|---|
| 3,159,573 | 12/1964 | Ritchie | 210/96.1 |
| 3,373,351 | 3/1968 | Rak | 324/449 |
| 3,675,041 | 7/1972 | Elliott et al. | 307/141 |
| 3,768,649 | 10/1973 | Fleckenstein | 210/96.1 |
| 3,926,071 | 12/1975 | Elliott | 74/567 |
| 4,257,887 | 3/1981 | Rak et al. | 210/140 |

*Primary Examiner*—Ivars C. Cintins
*Attorney, Agent, or Firm*—Hill, Van Santen, Steadman, Chiara & Simpson

[57] ABSTRACT

A novel electronic control circuit which utilizes an improved and greatly simplified arrangement for producing the reference voltage and which includes a probe which includes two pairs of spaced electrodes which are connected in a bridge circuit so that both a reference signal and a control signal is obtained for closing an energizing circuit and latch it until it is time for regeneration and in which the regeneration will occur only at preset times so as to not interfere with normal use.

5 Claims, 2 Drawing Figures

CIRCUIT AND APPARATUS FOR CONTROLLING A WATER SOFTENER

CROSS-REFERENCES TO RELATED APPLICATIONS

This invention is an improvement on the circuit of application Ser. No. 079,072 filed Sept. 26, 1979 entitled "Circuit and Apparatus for Controlling A Water Softener" in which the inventors are Stanley F. Rak and Donald P. DeVale.

BACKGROUND OF THE INVENTION

1. Field of the Invention

This invention relates in general to water softeners and in particular to a novel circuit for a water softener.

2. Description of the Prior Art

Probes to indicate resistance changes in ion exchange material in water softeners are shown in issued U.S. Pat. No. 3,373,351 to Stanley F. Rak and resistance sensing probe systems are disclosed in U.S. Pat. No. 3,159,573 to H. D. Ritchie. These systems of the prior art are designed to immediately rejuvenate and recondition the ion exchange resin which can occur at times when it is desirable that water be supplied from the system.

Thus, in the prior art various systems have been known for causing regeneration of the resin bed of a water softener such as manual regeneration, or regeneration based on a control device which initiates regeneration at fixed given intervals of time. The problem with these two systems is that the regeneration may occur before it is needed or, alternatively, it may not occur quickly enough and the water may not be properly softened toward the end of the interval. A third system for water softening is based on a control which causes water softening when the condition of the output water and/or the resin bed indicates that regeneration should occur. The problem with this type of system is that regeneration can occur at periods when there is a high demand for soft water and during regeneration generally the soft water is not available and the unsoftened is bypassed by the water softener.

Other known systems have utilized a pair of water softening or water conditioning apparatuses each having separate control units and in which the units are interconnected with interlocking devices to prevent both units from being in the regenerating condition at the same time and an example of this type of system is disclosed in U.S. Pat. No. 3,675,041. This type of system is expensive in that two complete systems are required. Copending application Ser. No. 079,072 referenced above discloses an improved system.

SUMMARY OF THE INVENTION

The present invention relates to a water softener system and control wherein a resistance sensing probe including two pairs of spaced electrodes are mounted in the ion exchange bed of the granular material carrying water softening ions to detect the condition of the ion exchange bed and when the condition is such that rejuvenation should occur a control circuit is placed in a latched condition to command rejuvenation. The control remains in the latched condition and rejuvenation does not occur until a preset time so that normal usage of water is not interrupted during the daytime. After the rejuvenation has occured the circuit is reset ready to again detect the condition which requires rejuvenation. In this invention a bridge circuit with reference and sensing electrodes is used and the bridge circuit provides a signal to the control circuit.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
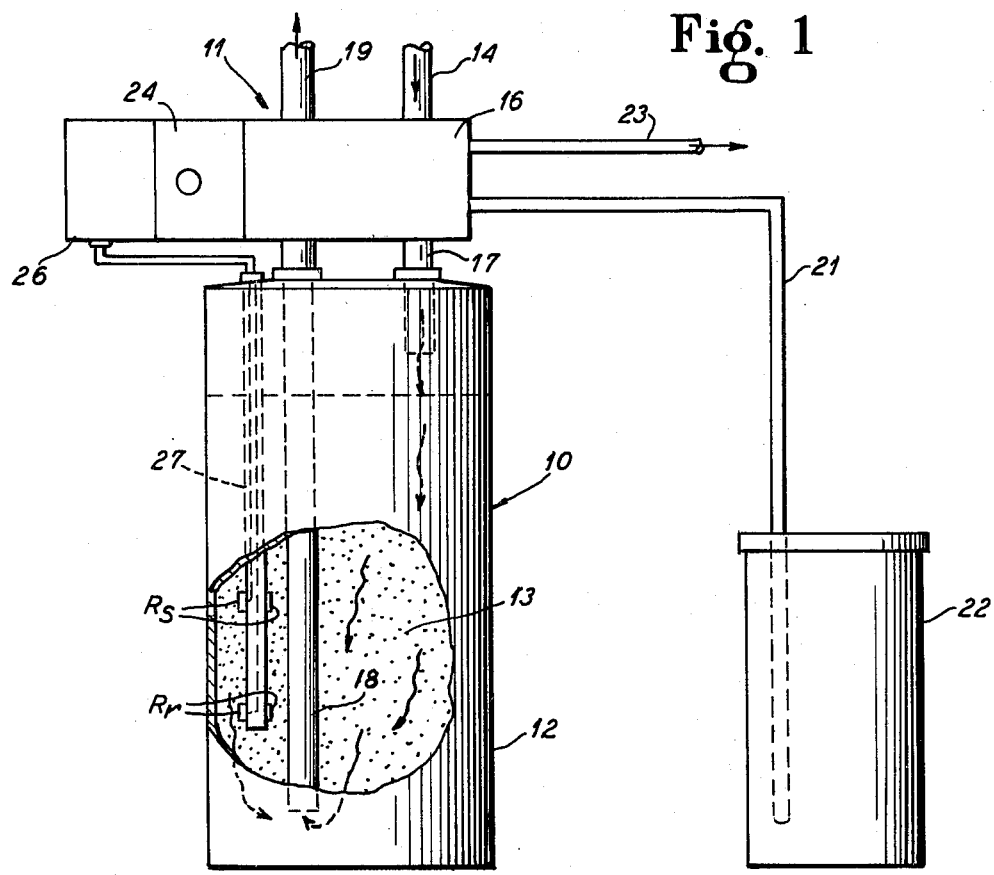
FIG. 1 is a plan view of a water softening system with certain portions cut away.
Figure 2:
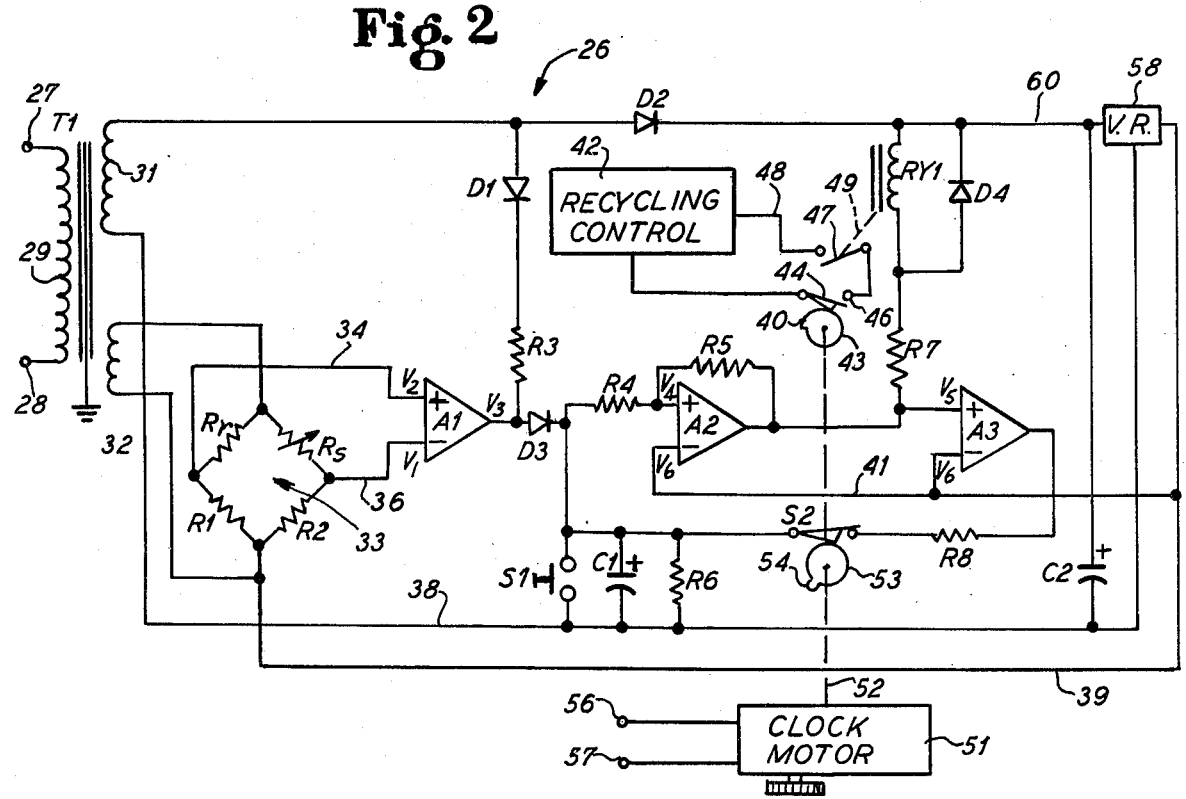
FIG. 2 is an electrical schematic of the control system of the invention.

FIG. 1 illustrates a water conditioning or softening apparatus or device generally indicated as 10 which has a control unit 11.

The water conditioning apparatus 10 includes a tank 12 containing a bed 13 of suitable ion exchange resin. So as to provide water to the tank, a water supply line 14 is connected to the valve housing 16 which passes the water through a pipe 17 which extends to the tank 12. The water passes down through the bed 13 and is removed by a pipe 18 through the valve housing 16 to a line 19 which supplies the softened water to the water system. A conduit 21 extends from the valve control to a brine tank 22 which contains salt for forming the brine. A drain conduit 23 is also connected to the valve housing 16 and is connected to a suitable drain.

The control valve structure 16 may be on conventional type as, for example, described in U.S. Pat. No. 3,926,071 and may be either the two or five cycle type which systems are well known to those skilled in the art. The recycling control 24 controls the recycling and might be, for example, such as described in U.S. Pat. No. 3,926,071 and in the present invention comprises an electronic control 26 which assures that the recycling does not occur except at predetermined times as, for example, between 2:00 and 6:00 A.M. so that rejuvenation does not occur at other times when is desired to obtain softened water.

The electronic control 26 of the present invention detects when rejuvenation of the resin bed should occur by the use of two pairs of vertically mounted electrodes $R_s$ and $R_r$ which are mounted in a suitable holding probe unit 27 which extends down into the tank 12 and are vertically spaced relative to each other for detecting the resistivity so as to determine when rejuvenation should occur for energizing a latching circuit. However, in the present invention rejuvenation of the resin bed is not immediately commenced when the condition is detected which indicates rejuvenation should occur, but rather the circuit of the invention remains in a latched condition until a time which has been preset at which time rejuvenation will occur and the detecting circuit will be reset after rejuvenation until rejuvenation is again required. In other words, in the present invention as soon as the resistivity difference between the detecting electrodes $R_s$ and $R_r$ is such that rejuvenation should occur then the circuit of the invention is placed in a latched condition and will remain in such latched condition until the resin is rejuvenated. However, the rejuvenation will not be initiated until the preset period as, for example, between 2:00 to 6:00 A.M. so that rejuvenation doesn't occur at those periods when there is a demand for softened water.

A pair of 60 cycle input power terminals 27 and 28 are connected to the primary 29 of a transformer T1 which has secondary windings 31 and 32. A bridge circuit 33 includes a pair of resistors R1 and R2 and a reference cell $R_r$ and a sensing cell $R_s$ connected in a bridge configuration. The junction point between resistors R1 and R2 is connected to one end of the secondary 32 and the other end of the secondary 32 is connected to the junction point between the sensing and reference cells $R_s$ and $R_r$.

A comparator A1 has its plus input V1 connected to lead 36 which is connected to the junction point between resistors $R_s$ and $R_2$. The negative input to the comparator A1 is designated V2 and is connected by lead 34 to the junction point between resistor R1 and the impedance $R_r$ of the bridge 33. The output of the comparator A1 designated V3 is connected through a diode D3 to a resistor R4 which is connected to the plus input of a second comparator A2. The other input to the comparator A2 designated V6 is connected to lead 41 which is connected to the output of a voltage regulator 58. A resistor R5 is connected between the output of the comparator A2 and the plus input V4. A third comparator A3 has its plus input V5 connected to the output of the comparator A2. The negative input to the comparator A3 is connected to lead 41. The output of the comparator A3 is connected to a resistor R8 and then through a reset switch S2 to the junction point between the diode D3 and the resistor R4. One end of the secondary 32 is connected by lead 39 to an output of the voltage regulator 58. An extra regeneration switch S1 is connected between lead 38 and the junction point between diode D3 and resistor R4. A capacitor C1 and resistor R6 are connected in parallel with the switch S1 as shown. A capacitor C2 is connected between lead 38 and lead 37 which is also connected to a third input of the regulator 58. A relay coil RY1 is connected from lead 60 to a resistor R7 which has its other side connected to the plus input of the comparator A3. A diode D4 is connected in parallel with the relay coil RY1. A diode D2 is connected from one side of the secondary 31 which connects to lead 37 and its other side is connected to lead 60. A diode D1 is connected from lead 37 to a resistor R3 which has its other side connected to the output of the comparator A1. A clock motor 51 receives power on input terminals 56 and 57 and has an output shaft which carries cams 53 and 43. The cam 53 has a high portion 54 which is engageable with a switch S2 to open it for resetting the circuit after regeneration has occurred. The cam 43 has a high portion 40 which engages a switch 44 to close it so it makes contact with a terminal 46. Contact 46 is connected to switch 47 which is controlled by the relay RY1 such that when the relay RY1 is energized and switch 47 is closed by the armature 49 of the relay so that lead 48 will be connected to contact 46. The lead 48 connects to a recycling control 42 such that when switches 47 and 44 are closed, regeneration of the ion exchange bed of the water softener will occur.

When the bridge circuit 33 is unbalanced such that $R_s$ is greater than $R_r$ the bridge will be unbalanced to produce an AC voltage V1 which is applied to the comparator A1. The voltage V1 will be in phase with the voltage V3 at the output of the comparator. The comparator A1 with a regulated voltage V2 applied and a variable voltage V1 applied due to variation in the resistance $R_s$ such that when V1 is less than V2 will cause the positive half cycle of the voltage V3 to charge the capacitor C1 through resistor R3 and the diode D3.

The comparator A2 which receives the applied voltage V4 which is essentially the voltage across the capacitor C1 as well as the voltage V6 which is a regulated voltage of approximately 5 volts such that when voltage V4 is greater than voltage V6 the relay RY7 will not be energized.

The comparator A3 which receives an applied voltage of V5 which is high about 14 volts when the relay is not energized as well as the voltage V6 which is from the regulator 58 and which is approximately 5 volts. When V5 is greater than V6, no clamping action occurs at V4 which is the input to the comparator A2.

The diode D2 and the capacitor C2 provide rectification and filtering.

When the sensor resistance $R_s$ increases, the bridge circuit 33 becomes unbalanced such that the positive half cycles of voltage V1 exceed the set level voltage V2 and the comparator A1 will clamp voltage V3 during the positive half cycles of V1. Since V1 and V3 are in phase, and the positive half cycles of voltage V3 charge the capacitor C1 through diode D3, then the voltage V3 will be clamped by the comparator A1 during the positive half cycles of V3 which would normally keep capacitor C1 charged.

The voltage across the capacitor C1 (V4) will start to decay since C1 is discharging through the resistor R6 to ground and resistor R4 through the input of the comparator A2. When the voltage V4 becomes less than the voltage V6 the comparator A2 will clamp the relay RY1 to ground (V5 equals 0) thereby energizing the relay.

At this time, V5 will be lower than voltage V6 and comparator A3 will clamp C1 to ground thereby maintaining the relay in the energized position. The relay closes switch 47 and the clock motor 51 and portion 40 of cam 43 will close switch 44 at the appropriate time to provide regeneration of the ion bed. The cam 53 has a high point 54 which will open switch S2 to reset the circuit so that the relay RY1 will be de-energized at a time when $R_s$ equals $R_r$ by momentarily opening switch S2.

The discharge time of capacitor C1 is set by resistor R6 to a value of about 30 seconds so as to prevent premature or false lockups.

It is to be noted that if the bridge 33 is unbalanced in the reverse direction such that $R_r$ is greater than $R_s$ nothing happens because the voltages V1 and V2 will then be out of phase.

Resistor R8 protects comparator A3 from a high in-rush current but is low enough in value to maintain the voltage V4 below the voltage V6.

In a particular circuit construction according to the invention, the components had the following values:

| Reference | Description |
|---|---|
| T1 | 120V/12V/2.5V |
| R1 | 200 OHM 1% M.F. |
| R2 | 215 OHM 1% M.F. |
| R3 | 4.7K 5% C.F. |
| R4 | 4.7K 5% C.F. |
| R5 | 10M 5% C.F. |
| R6 | 1M 5% C.F. |
| R7 | 680 OHM 5% C.F. |
| R8 | 4.7K 5% C.F. |

| Reference | Description |
| --- | --- |
| Rr | Probe Reference Cell |
| Rs | Probe Sensing Cell |
| C1 | 22 µfd 35V |
| C2 | 100 µfd 25V |
| D1 | 1N4001 |
| D2 | 1N4001 |
| D3 | 1N4001 |
| D4 | 1N4001 |
| A1 | ¼ CA 339G |
| A2 | ¼ CA 339G |
| A3 | ¼ CA 339G |
| Vr | 78L05A Voltage Regulator |
| S1 | SPST (Extra Regeneration) |
| S2 | SPST (Reset) |
| RY1 | Electrol R7310-1 Relay |

The circuit of the invention is simpler than the circuit of copending application Ser. No. 079,072 and a reference potentiometer is not required for establishing a reference voltage for the comparator A1. In the present invention, the reference is applied from lead 36 from the bridge circuit 33.

Although the invention has been described with respect to preferred embodiments, it is not to be so limited as changes and modifications can be made which are within the full intended scope of the invention as defined by the appended claims.

We claim as our invention:

1. Apparatus for regenerating the ion exchange bed of a water softener having a regenerating means and a recycling control connected to control the regenerating means comprising, a first pair of resistors, two pairs of spaced electrodes and at least one mounted in the ion exchange bed, one providing a reference and the other sensing, a bridge circuit including said pairs of electrodes and said first pair of resistors, an A.C. power supply signal applied to said bridge circuit, a first comparator receiving a first input from said bridge circuit from the junction point between said reference electrodes and one of said first pair of resistors and a second input from said bridge circuit from the junction point between the other one of said first pair of resistors and said sensing electrodes, a relay with switch contacts operated by said first comparator, a latching circuit connected to said relay to maintain it energized, a timing means capable of being set to selected time periods, and a recycle switch controlled by said timing means and said recycle switch and the switch contacts of said relay connected in circuit with said recycling control including a reset switch connected to said latching circuit for resetting it and wherein said reset switch is controlled by said timing means to reset said latching circuit after said ion bed has been regenerated and including a time delay circuit connected between said first comparator and relay so that said relay is operated only if the output of said first comparator indicates that regeneration should occur for a fixed time period.

2. Apparatus according to claim 1 including a second comparator receiving the output of said time delay circuit and a reference signal and its output connected to said relay.

3. Apparatus according to claim 2 wherein said latching circuit includes a third comparator which receives a reference signal and the output of said second comparator and supplies its output to the input of said second comparator through said reset switch.

4. Apparatus according to claim 1 wherein said time delay circuit includes a capacitor and resistor.

5. Apparatus according to claim 1 including unilateral direction current means between said capacitor and said first comparator.

* * * * *